United States Patent
Zambaux

(10) Patent No.: US 10,858,132 B2
(45) Date of Patent: Dec. 8, 2020

(54) DISPOSABLE PRODUCTION LINE FOR FILLING AND FINISHING A PRODUCT

(71) Applicant: Pall Life Sciences Belgium BVBA, Hoegaarden (BE)

(72) Inventor: Jean-Pascal Zambaux, Audenge (FR)

(73) Assignee: Pall Life Sciences Belgium BVBA, Hoegaarden (BE)

( * ) Notice: Subject to any disclaimer, the term of this patent is extended or adjusted under 35 U.S.C. 154(b) by 1647 days.

(21) Appl. No.: 14/518,194

(22) Filed: Oct. 20, 2014

(65) Prior Publication Data

US 2015/0107190 A1 Apr. 23, 2015

(30) Foreign Application Priority Data

Oct. 18, 2013 (EP) .................................... 13306437

(51) Int. Cl.
*B65B 55/02* (2006.01)
*B25J 21/02* (2006.01)

(52) U.S. Cl.
CPC ............. *B65B 55/027* (2013.01); *B25J 21/02* (2013.01)

(58) Field of Classification Search
CPC ... B65B 55/025; B65B 55/027; B65B 7/2821; B65B 7/2842; B25J 21/02; B67B 1/04
USPC ................. 53/502, 299, 319, 324, 328, 361; 100/226, 229 R, 269.02; 312/1
See application file for complete search history.

(56) References Cited

U.S. PATENT DOCUMENTS

| | | | | |
|---|---|---|---|---|
| 2,353,985 A * | 7/1944 | Barr | ..................... | B65B 31/027 53/101 |
| 2,656,086 A * | 10/1953 | Haynes | ..................... | B67B 1/04 53/487 |
| 3,292,342 A * | 12/1966 | Kapeker | ............... | B65B 31/027 53/101 |
| 3,415,582 A * | 12/1968 | Trexler | ..................... | B25J 21/02 312/1 |
| 3,832,892 A * | 9/1974 | Bohl | ......................... | B67B 3/12 73/818 |
| 3,863,561 A * | 2/1975 | Karls | ..................... | B65F 1/1473 100/352 |
| 4,170,421 A | 10/1979 | Balding et al. | | |
| 4,265,071 A * | 5/1981 | Smith | ..................... | B67B 7/182 53/331.5 |

(Continued)

FOREIGN PATENT DOCUMENTS

| CN | 202322327 U | 7/2012 |
|---|---|---|
| DE | 4030186 A1 | 4/1991 |

(Continued)

OTHER PUBLICATIONS

Greb, "The Future of Disposable Containment", PharmTech.com, Jun. 18, 2008, 2 Pages—XP002572222.
European Search Report EP 14 18 9523 dated Mar. 17, 2015.

*Primary Examiner* — Dariush Seif
(74) *Attorney, Agent, or Firm* — King & Schickli, PLLC

(57) ABSTRACT

An apparatus for processing one or more products in need of closure. The apparatus comprises a vessel including an inlet for receiving the one or more products and an outlet for discharging the one or more products under sterile and/or pyrogen free conditions. A device is also adapted for applying the closure to the one or more products in the vessel, along with the optional filling and/or weighing of the products before or after applying the closure. Related apparatuses, systems, and methods are disclosed.

10 Claims, 7 Drawing Sheets

(56) References Cited

U.S. PATENT DOCUMENTS

| | | | | |
|---|---|---|---|---|
| 4,286,389 A * | 9/1981 | Ogle | ................... | F26B 5/06 |
| | | | | 215/307 |
| 4,416,417 A | 11/1983 | Sanderson et al. | | |
| 4,528,796 A * | 7/1985 | Lemaire | ................... | B67C 7/00 |
| | | | | 53/268 |
| 4,549,717 A | 10/1985 | Dewaegheneire | | |
| 5,159,799 A | 11/1992 | Rising et al. | | |
| 5,219,215 A * | 6/1993 | Akagawa | ................... | B01L 9/02 |
| | | | | 312/1 |
| 5,255,809 A | 10/1993 | Ervin et al. | | |
| 5,262,578 A * | 11/1993 | Hall | ................... | B08B 15/026 |
| | | | | 141/93 |
| 5,342,121 A * | 8/1994 | Koria | ................... | A61G 10/005 |
| | | | | 312/1 |
| 5,355,789 A * | 10/1994 | Suzuki | ................... | B30B 9/3021 |
| | | | | 100/92 |
| 5,377,950 A * | 1/1995 | Salcudean | ................... | B25J 3/04 |
| | | | | 248/550 |
| 5,398,481 A * | 3/1995 | Takeuchi | ................... | H01L 21/67772 |
| | | | | 53/405 |
| 5,476,635 A | 12/1995 | Stoker | | |
| 5,519,984 A * | 5/1996 | Beussink | ................... | B65B 3/003 |
| | | | | 53/324 |
| 5,540,901 A | 7/1996 | Riley | | |
| 5,585,771 A | 12/1996 | Ervasti et al. | | |
| 5,881,535 A * | 3/1999 | Gliniecki | ................... | B65B 43/54 |
| | | | | 53/133.2 |
| 5,890,781 A | 4/1999 | Ryder | | |
| 5,971,043 A * | 10/1999 | Aldrich | ................... | B67C 3/30 |
| | | | | 141/129 |
| 6,019,008 A * | 2/2000 | Kim | ................... | B25J 1/08 |
| | | | | 74/89.22 |
| 6,428,122 B1 * | 8/2002 | Henry | ................... | B01L 1/50 |
| | | | | 220/745 |
| 6,651,404 B1 * | 11/2003 | Hertfelder | ................... | B65B 55/02 |
| | | | | 53/167 |
| 6,749,808 B1 | 6/2004 | Huynen et al. | | |
| 6,793,617 B2 | 9/2004 | Ford et al. | | |
| 6,972,115 B1 | 12/2005 | Ballard | | |
| 7,146,781 B1 | 12/2006 | Cole | | |
| 7,174,772 B2 | 2/2007 | Sacca | | |
| 7,455,668 B2 | 11/2008 | Petrakis | | |
| 7,523,827 B2 | 4/2009 | Dane et al. | | |
| 7,690,406 B2 | 4/2010 | Giesen | | |
| 8,298,054 B2 * | 10/2012 | Hodge | ................... | G05B 15/02 |
| | | | | 454/187 |
| 8,950,579 B2 | 2/2015 | Zambaux | | |
| 9,079,319 B2 * | 7/2015 | Zambaux | ................... | B25J 21/02 |
| 9,149,939 B2 * | 10/2015 | Zambaux | ................... | B25J 21/02 |
| 2002/0043273 A1 | 4/2002 | Chau | | |
| 2002/0179602 A1 | 12/2002 | Cocker et al. | | |
| 2002/0179625 A1 | 12/2002 | Huang et al. | | |
| 2003/0137225 A1 | 7/2003 | Hauville | | |
| 2004/0060260 A1 | 4/2004 | Gottlieb et al. | | |
| 2004/0139698 A1 * | 7/2004 | Grifols Lucas | ................... | A61L 2/07 |
| | | | | 53/426 |
| 2004/0158121 A1 * | 8/2004 | Ford | ................... | B08B 15/026 |
| | | | | 600/21 |
| 2004/0215362 A1 * | 10/2004 | Kokubo | ................... | A61L 2/04 |
| | | | | 700/130 |
| 2005/0110287 A1 * | 5/2005 | Florindi | ................... | H01L 21/68707 |
| | | | | 294/2 |
| 2005/0232807 A1 | 10/2005 | Nishimura | | |
| 2006/0119232 A1 * | 6/2006 | Tattershall | ................... | B01L 1/50 |
| | | | | 312/1 |
| 2006/0255064 A1 | 11/2006 | Donaldson | | |
| 2006/0283856 A1 | 12/2006 | Spinelli et al. | | |
| 2007/0014686 A1 | 1/2007 | Arnold et al. | | |
| 2007/0034643 A1 | 2/2007 | Keyes et al. | | |
| 2007/0095024 A1 * | 5/2007 | Neeper | ................... | B65B 7/2821 |
| | | | | 53/485 |
| 2007/0225785 A1 | 9/2007 | Park et al. | | |
| 2008/0034964 A1 | 2/2008 | Schmidt | | |
| 2008/0078144 A1 * | 4/2008 | Cirio | ................... | B67B 3/2033 |
| | | | | 53/359 |
| 2008/0141622 A1 | 6/2008 | Bechini | | |
| 2008/0240981 A1 | 10/2008 | Berentsveig et al. | | |
| 2009/0014459 A1 | 1/2009 | Hood et al. | | |
| 2010/0044372 A1 * | 2/2010 | Kournikakis | ................... | B01L 1/04 |
| | | | | 220/9.2 |
| 2010/0107567 A1 * | 5/2010 | Khan | ................... | B65B 9/15 |
| | | | | 53/469 |
| 2010/0253071 A1 * | 10/2010 | Lloyd | ................... | B65B 1/28 |
| | | | | 285/236 |
| 2010/0287891 A1 * | 11/2010 | Lee | ................... | B05B 11/3074 |
| | | | | 53/473 |
| 2011/0072762 A1 * | 3/2011 | Jakob | ................... | B67B 3/02 |
| | | | | 53/285 |
| 2011/0100397 A1 | 5/2011 | Rolin | | |
| 2012/0006717 A1 | 1/2012 | Zambaux | | |
| 2012/0031042 A1 * | 2/2012 | Zambaux | ................... | B25J 21/02 |
| | | | | 53/167 |
| 2012/0079792 A1 * | 4/2012 | Kampmann | ................... | B67B 3/2013 |
| | | | | 53/285 |
| 2012/0090268 A1 * | 4/2012 | Krauss | ................... | B65B 3/003 |
| | | | | 53/281 |
| 2012/0107174 A1 | 5/2012 | Zambaux | | |
| 2012/0248057 A1 * | 10/2012 | Bogle | ................... | A61J 1/1406 |
| | | | | 215/43 |
| 2012/0294697 A1 * | 11/2012 | Zambaux | ................... | B25J 21/02 |
| | | | | 414/217 |
| 2012/0311963 A1 * | 12/2012 | Fukuda | ................... | B67B 3/2053 |
| | | | | 53/317 |
| 2013/0017131 A1 * | 1/2013 | Galliher | ................... | C12M 37/00 |
| | | | | 422/544 |
| 2014/0196411 A1 * | 7/2014 | Procyshyn | ................... | B25J 21/02 |
| | | | | 53/467 |
| 2016/0200461 A1 * | 7/2016 | Broadbent | ................... | B65B 55/04 |
| | | | | 53/426 |
| 2016/0272347 A1 * | 9/2016 | Procyshyn | ................... | B65B 55/04 |

FOREIGN PATENT DOCUMENTS

| | | |
|---|---|---|
| DE | 102007002105 A1 | 7/2008 |
| EP | 0201994 A2 | 11/1986 |
| EP | 1264668 A2 | 12/2002 |
| EP | 9305210.8 | 5/2009 |
| FR | 2155816 A1 | 5/1973 |
| FR | 2293769 A1 | 7/1976 |
| FR | 2946905 A1 | 12/2010 |
| GB | 1528478 A | 10/1978 |
| GB | 2262968 A | 7/1993 |
| JP | 58149232 | 1/1983 |
| JP | 03046599 | 7/1987 |
| JP | 01182226 | 12/1987 |
| JP | H0342599 U | 4/1991 |
| JP | H05157302 A | 6/1993 |
| JP | H0574538 U | 10/1993 |
| JP | H11138120 A | 5/1999 |
| JP | 2000024098 A | 1/2000 |
| JP | 2001337039 | 5/2000 |
| JP | 2001158404 | 10/2000 |
| JP | 2004-067194 | 3/2004 |
| JP | 2006204136 | 1/2005 |
| JP | 2008232541 A | 10/2008 |
| JP | 2010148845 | 11/2008 |
| WO | 8301740 A1 | 5/1983 |
| WO | 03035116 A2 | 5/2003 |
| WO | 2004114378 A1 | 12/2004 |
| WO | 2007019568 A2 | 2/2007 |
| WO | 2008084047 A1 | 7/2008 |
| WO | WO2010044025 | 10/2009 |
| WO | 2010136510 A1 | 12/2010 |
| WO | 2012013910 A1 | 2/2012 |
| WO | WO2015023924 A2 | 2/2015 |

* cited by examiner

DISPOSABLE PRODUCTION LINE FOR FILLING AND FINISHING A PRODUCT

TECHNICAL FIELD AND BACKGROUND

This invention relates to a disposable production line for processing, manipulating, manufacturing and/or packaging products or devices under an inert atmosphere, and/or sterile conditions and/or a pyrogen free environment. This invention further relates to U.S. Patent Application Pub. Nos. 2012/0031042 and 2012/0294697 to Zambaux, the disclosures of which are incorporated herein by reference.

SUMMARY

This disclosure may be considered to relate to an apparatus for processing one or more products in need of a closure. The apparatus includes a vessel including an inlet for receiving the one or more products and an outlet for discharging the one or more products under sterile and/or pyrogen free conditions. A device, such as a tool, is adapted for applying the closure to the one or more products in the vessel.

In one embodiment, the device comprises a sleeve connected to a wall of the vessel, such as the top wall. The sleeve may comprise a flexible sleeve having a rigid portion adapted for applying the closure to at least one product. The rigid portion may be adapted for applying a closure to each of a plurality of products simultaneously.

The apparatus may further include a platform in the vessel opposite the device for supporting the one or more products, which platform may be connected to a motive device and move from the inlet to the outlet of the vessel. The device may comprise a tool in the form of a press. The press may be positioned in the sleeve, and the vessel may comprise at least one flexible wall (such as part of a flexible bag).

The apparatus may further include a scale associated with the vessel for weighing the one or more products before or after applying the closure. A platform may be provided for supporting the product or products for being weighed on the scale. A conduit for pressurizing the vessel may also be provided. The apparatus may include a glove attached to the vessel for manipulating one or more of the product, the device, or the closure, and a basket or tray may support a plurality of products in the vessel. The device may be adapted to apply a closure to the plurality of products in a simultaneous fashion while positioned in the basket or tray.

A further aspect of the disclosure relates to the foregoing system, and further including an apparatus comprising a filler or filling means for filling the product prior to passing the product to the vessel for receiving the closure.

Still another aspect of the disclosure pertains to an apparatus for processing one or more products. The apparatus comprises a vessel including an inlet for receiving the one or more products and an outlet for discharging the one or more products under sterile and/or pyrogen free conditions. A platform for supporting the one or more products in the vessel is adapted for moving toward the inlet or the outlet of the vessel. A motive device may be provided for moving the platform, which may be connected to a wall of the vessel between the inlet and the outlet.

A further aspect of the disclosure relates to a method of processing a product. The method comprises applying a closure to the product using a press contained at least partially within a sleeve projecting into a compartment of a vessel under sterile and/or pyrogenic conditions. A further aspect relates to a method of processing a product comprising moving a product on a platform in a compartment of a vessel under sterile or pyrogenic conditions from closer to an inlet of the vessel to closer to an outlet of the vessel. Either method may further include the step of filling the product prior to the step of applying the closure or moving the product.

BRIEF DESCRIPTION OF THE DRAWING FIGURES

DETAILED DESCRIPTION

Figure 1:
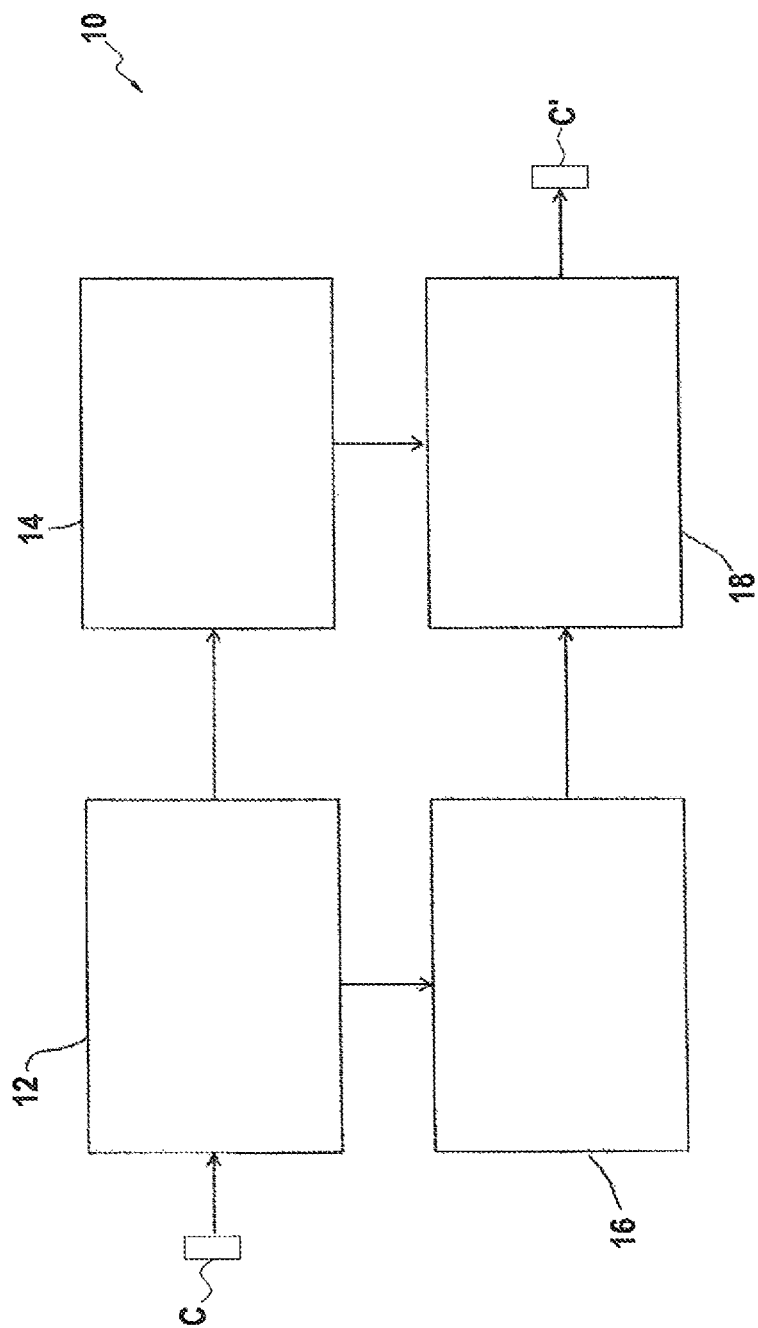
FIG. 1 is a schematic view of one embodiment of the product processing system.

A system 10 for processing a product under an inert atmosphere, under sterile conditions, and/or in a pyrogen free environment, is disclosed. The system 10 may include a plurality of isolators, which may be connected to one another to complete the system 10. In the exemplary embodiment illustrated in FIG. 1, the system 10 includes a first transfer isolator 12, a second transfer isolator 14, a filling isolator 16, and a weighing and capping isolator 18. Each of the isolators 12, 14 may include at least one flexible wall, and may be in the form of a flexible and/or disposable vessel, such as a bag.

Figure 2:
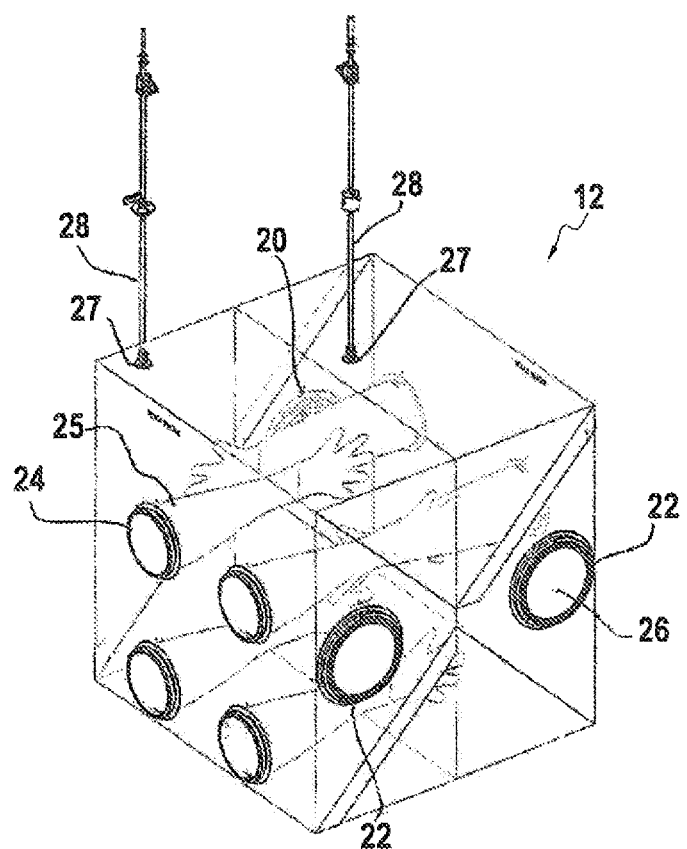
FIGS. 2-5 illustrate various examples of isolators for use in the system of FIG. 1.

With further reference to FIG. 2, the first transfer isolator 12 may include at least one inlet 20 and one or more outlets 22. Each of the inlet(s) 20 and the outlet(s) 22 may comprise a port for sealing with another isolator or other container under a controlled atmosphere, sterile and/or pyrogen free conditions. In addition, the first transfer isolator 12 may include one or more regulating ports 27, which may be attached to a gas tube 28 that may be used to inflate and/or deflate the first transfer isolator 12, and/or to introduce a sterile, inert, and/or pyrogen free gas to create a desired atmosphere within the first transfer isolator. These regulating ports 27 and/or gas tubes 28 may be used to control and/or manipulate the pressure within an isolator.

The first transfer isolator 12 may further include one or more glove ports 24 for allowing access to manipulations of the contents of an interior of the first transfer isolator 12 in a sealed manner. These glove ports 24 may be connected to one or more gloves 25. The gloves 25 may be located on two or more sides of the isolator, such as on opposite sides, so as to allow for two or more people to work in the isolator at the same time. Each side of the isolator 12 may include upper gloves and lower gloves, so as to allow an operator to work from both a standing and a sitting position. In practice, there may be times when transferring an item from one isolator to another may require picking up an item with a lower glove and moving it into a hand in the upper glove because the upper glove is closer to the outlet (or vice-versa when transferring into an isolator).

Sterile and/or pyrogen free containers C may be transported in a transfer station (not shown) that may be linked to the inlet 20 of the first transfer isolator 12. The transfer station may be disposable or non-disposable in nature. Once linked, the system 10 may be considered a closed system, with each isolator or other container being linked by connectors, such as flexible tubes. These connectors may be of the type disclosed in either of U.S. Patent App. Pub. Nos. 2012/0031042 or 2012/0294697.

The connectors may be closed off by doors 26 on each side of the connector (to initially isolate each section from the other sections and to allow for cleaning and sterilization of the connectors). Once the transfer station is attached, all the doors 26 may be removed. The containers C may then be passed into the first transfer isolator 12 through the inlet 20 and uncapped therein. The uncapped containers may be placed into a tray or basket and the caps may be placed in a different tray or basket.

As illustrated in FIG. 2, the first transfer isolator 12 may have plural outlets 22. The closure, caps or other pieces for use in assembling the product may be passed through one of the outlets to the second transfer isolator 14. The products, such as uncapped containers C, may be passed through the second of the two outlets to the filling isolator 16.

Figure 3:
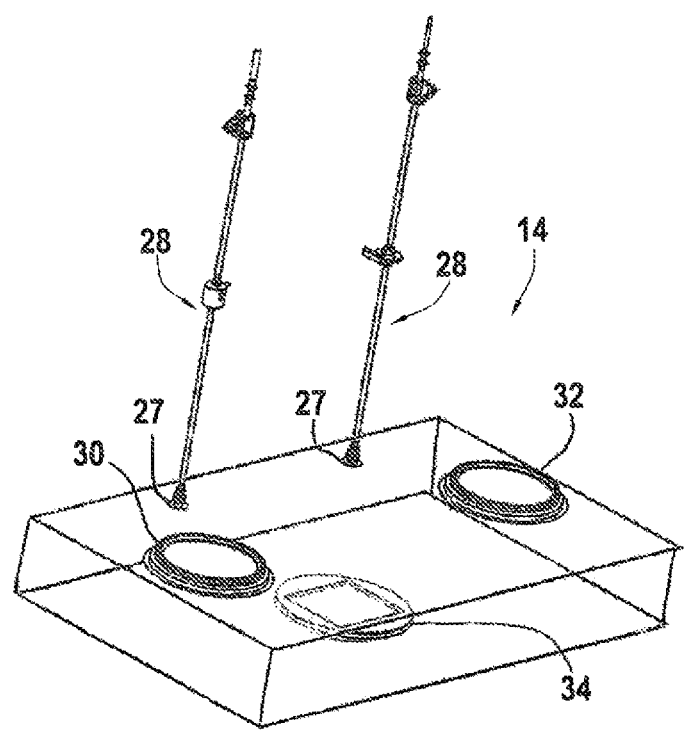

FIG. 3 illustrates the second transfer isolator 14 in further detail. The second transfer isolator 14 may include one or more inlets 30 and one or more outlets 32. In the illustrated embodiment, the second transfer isolator 14 includes a single inlet and a single outlet. The second transfer isolator 14 may also include one or more regulating ports 27 and/or gas tubes 28 for regulating the atmosphere within the second transfer isolator 14.

In addition, a platform 34 may be included in the second transfer isolator 14 for facilitating movement of items, such as products, within the isolator. The platform 34 may interact with a motive device outside of the isolator for manipulating a position of the platform within the interior of the second transfer isolator 14. The motive device may include an electronic motor and/or a manual motive device.

The platform 34 may be connected to the wall of the second transfer isolator 14, such as by welding, and may be provided with sufficient flexible material to allow for the platform to move within the interior of the isolator. In use, the platform 34 may be moved closer to the inlet 30 to receive items from the first transfer isolator 12, such as caps removed from the containers C. The platform 34 may then be moved closer to the outlet 32 to allow passage of items, such as uncapped containers, for downstream processing, such as to the weighing and capping isolator 18.

Figure 4:
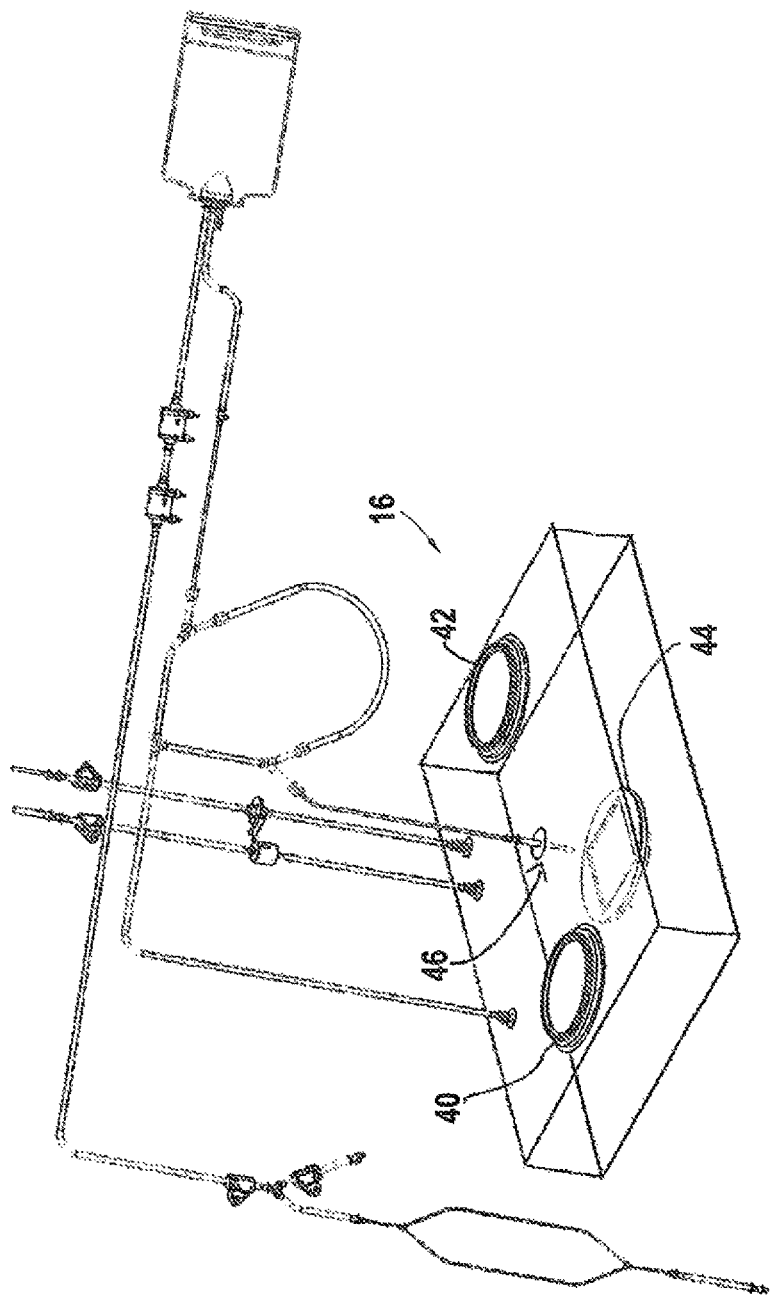

One example of a filling isolator 16 is shown in further detail in FIG. 4. This particular filling isolator 16 includes an inlet 40 for receiving items, such as from the first transfer isolator 12. An outlet 42 may also be included in the filling isolator 16, such as for delivering filled containers to the weighing and capping isolator 18. The filling isolator 16 may include a dispenser, such as a filling means 46, for dispensing a product into a container C within the isolator. The filling means 46 may include a needle in communication with a conduit and a source of the substance to be used to fill the container C, and may be similar to that which is disclosed in U.S. Patent App. Pub. No. 2012/0031042. The filling isolator 16 may also include one or more regulating ports 27 and/or gas tubes 28 for regulating the atmosphere within the isolator.

In addition, the filling isolator 16 may include a platform 44, which may be moveable within the interior of the isolator. The platform 44 may interact with a motive device as described above for controlling the position of the platform. In practice, a carrier, such as a tray or basket, carrying the uncapped container(s) may be placed on the platform 44. An actuator may cause the filling means 46 and the platform 44 to align with one another to facilitate filling of the container(s). In the case of the filling isolator including a flexible wall and the filling means 46 is connected to it, this allows for the filling means 46 to be lowered into each container and fill the container C with a given substance. The platform 44 may be automatically shifted according to preset specifications until plural containers C in a particular group are filled. At the end of the filling process, the platform 44 may be manipulated to a position close enough to the outlet 42 so that the filled containers may be passed into the weighing and capping isolator 18, and then alight as completed containers C' from the associated outlet.

Figure 5:
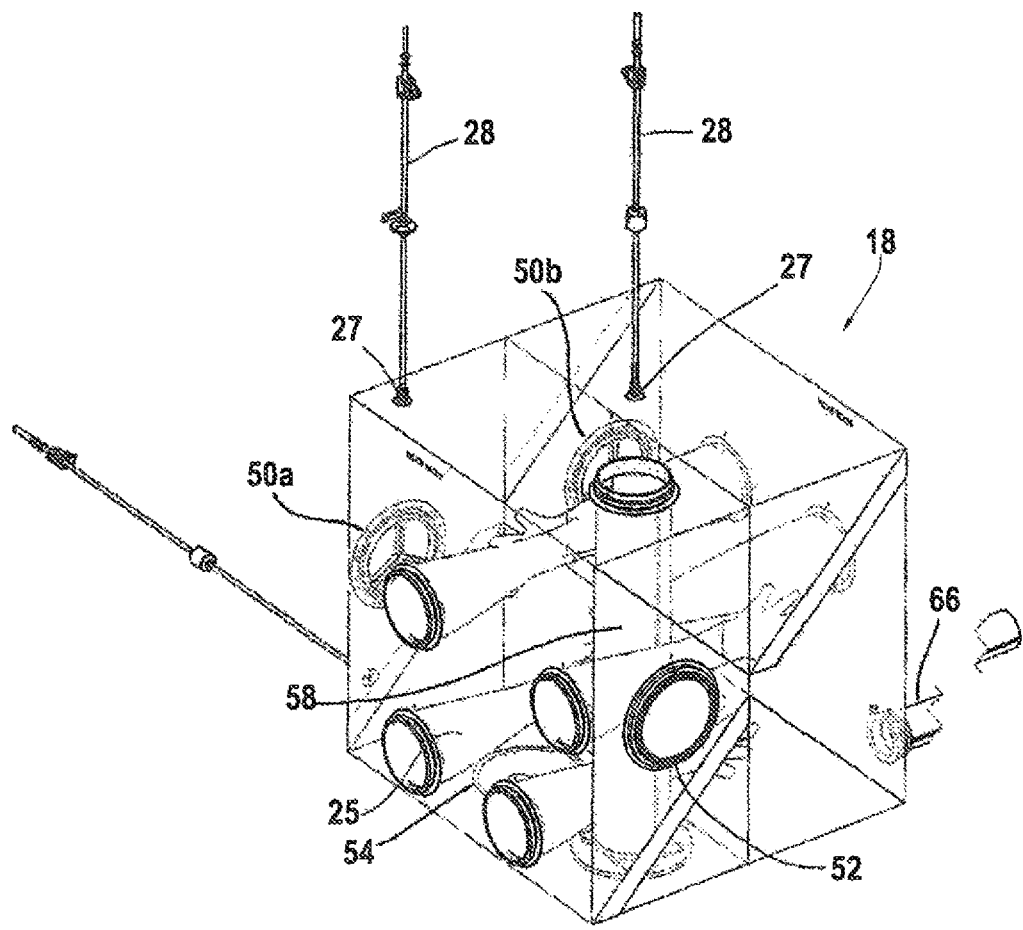
Figure 6:
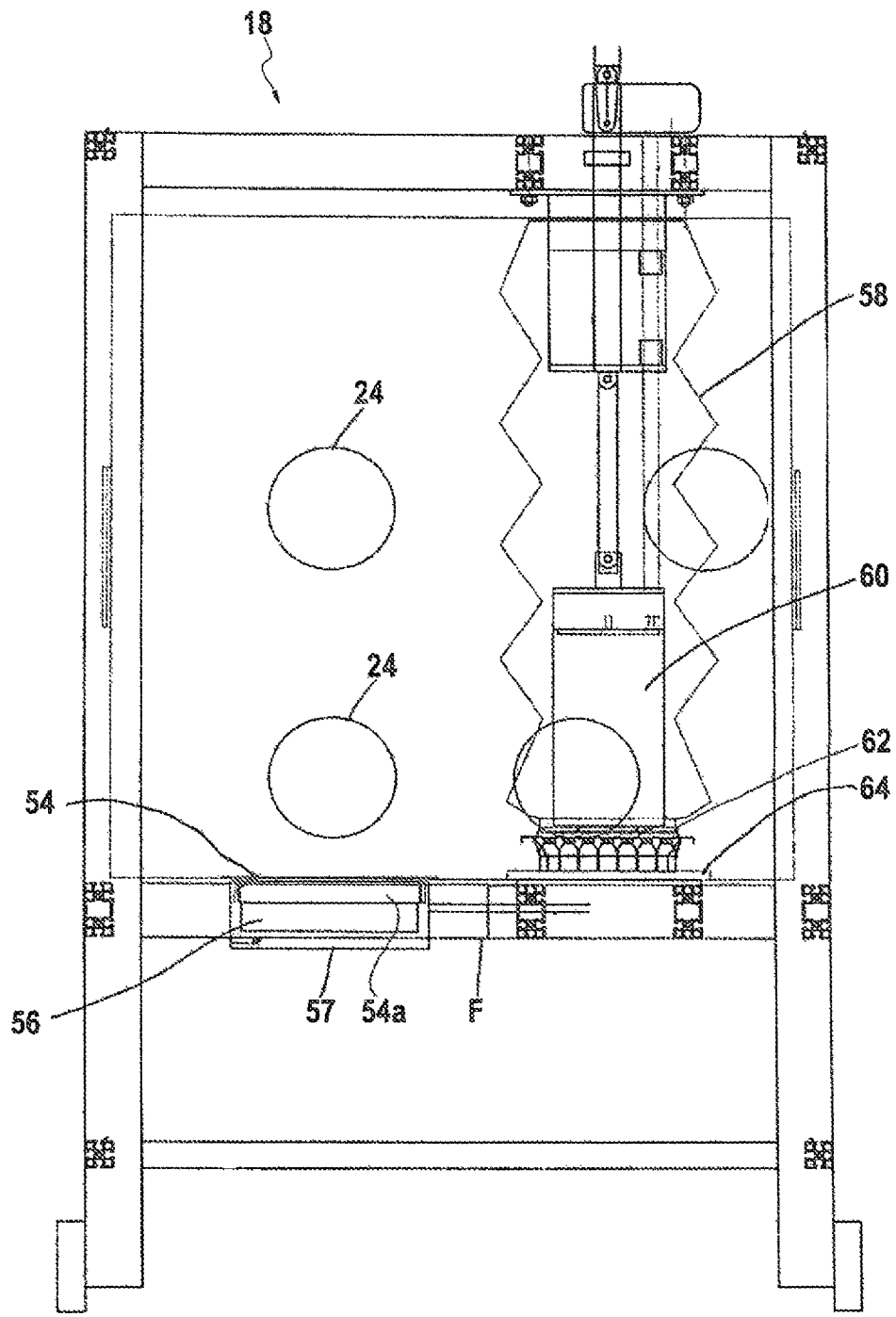
FIGS. 6-7 illustrate another example of an isolator for weighing/capping products.
Figure 7:
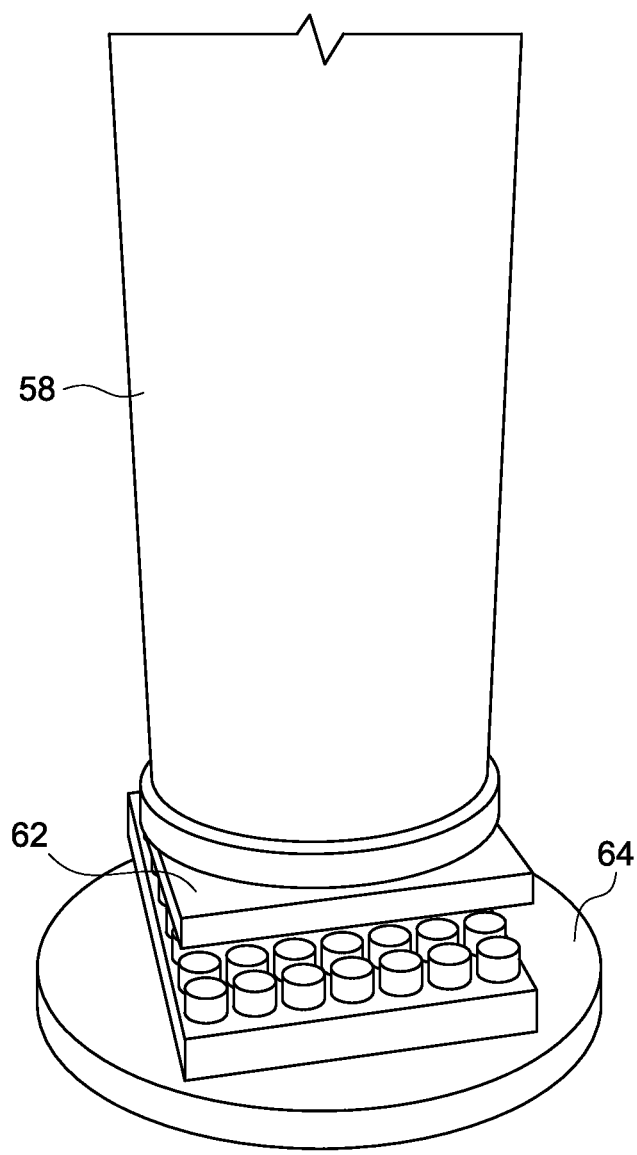

The weighing and capping isolator 18 is shown in further detail in FIGS. 5-7. This isolator 18 may include two inlets 50a, 50b. The first inlet 50a may be utilized for receiving caps from the second transfer isolator 14, while the second inlet 50b may be utilized for receiving filled containers from the filling isolator 16. The weighing and capping isolator 18 may further include an outlet 52 for removing items from the isolator and/or the system 10.

The weighing and capping isolator 18 may be adapted for interacting with a scale 56 for the weighing one or more containers within the isolator, such as filled containers received from the filling isolator 16. The scale 56 may be external to the interior of the weighing and capping isolator 18, and may be supported within a well 57 external to the isolator. The well 57 may be included in a frame F supporting the weighing and capping isolator.

The weighing and capping isolator 18 may further include a cover 54 for interacting with the scale 56. The cover 54 may form a seal with the wall of the weighing and capping isolator 18 so as to allow for pressure control within the isolator, and to seal the scale outside of an interior of the isolator. The cover 54 may also be made partially or entirely of plastic, such as polyethylene. The cover 54 may further include an opening or recess 54a, such as in the center of the cover, with a flexible film that allows for centering of a product or container on the scale 56. The flexible film may seal the opening while allowing a certain degree of movement of a product or container within the flexible film.

In addition, the weighing and capping isolator 18 may include a sleeve 58, which may fully or partially cover a device for applying a closure to the product, such as a tool in the form of a capping mechanism 60 for applying a closure to the container C. The capping mechanism 60 may be in the form of a press or similar device capable of moving within the weighing and capping isolator 18 toward and away from the product, and in a manner such that pressure is applied to the product. In another embodiment, the capping mechanism 60 may be adapted to move both in a vertical direction, up and down within the isolator 18, as well as in one or more horizontal directions, such that the capping mechanism 60 may move in three dimensions.

The sleeve 58 may be flexible, so as to allow for movement of the capping mechanism 60 within the isolator 18. Additionally, the sleeve 58 may function to fully or partially seal the capping mechanism 60 from the interior of the weighing and capping isolator 16. This may allow the capping mechanism 60 to interact indirectly with one or more items within the weighing and capping isolator 18, such as containers C, through the sealed sleeve 58.

As shown in FIG. 7, the sleeve 58 may further include a platform at the end within the interior compartment of the vessel forming the isolator 18, which platform may comprise capping element 62 adapted to contact one or more containers C. The capping element 62 may include a flat lower surface for directly contacting the caps. In another embodiment, the capping element 62 may include a flexible or malleable surface for molding or at least partially surrounding one or more of the closures or caps on the containers. In a further embodiment, the capping element 62 may include one or more pre-formed recesses for receiving one or more of the caps on the containers within the weighing and capping isolator 18.

The sleeve 58 and/or capping mechanism 60 may be positioned above a capping platform 64 within the isolator. The capping platform 64 may be configured to accept a tray or basket of products, such as vials or containers, and then position the containers below the capping mechanism 60. The platform 64 may include a centering device for ensuring that the tray or basket is centered beneath the sleeve 58 and/or capping mechanism 60. This centering device may include one or more locators, such as recesses or projections, for interacting with corresponding locators in the tray or basket, such as recesses or projections. Alternately, the centering device may include a recess for receiving the tray or basket or a projection from the tray or basket.

Additionally, the weighing and capping isolator 18 may further include a secondary outlet 66. This secondary outlet 66 may be utilized for removal of a single container from the isolator 18, such as in the case of there being a question about the accuracy of the scale.

In practice, a filled container C or containers may be weighed to ensure a proper amount of a given substance, such as a pharmaceutical compound, is present. The caps may then be initially placed on the containers, either before or after the containers have been placed in the tray. This initial placement of the cap or closure on the containers may be done by hand, such as by the use of the gloves 25 in the isolator 18. Placement of the containers in the trays may be done after an individual container has been weighed, or the containers may be placed in the tray or basket and the tray or basket and containers may be weighed together. The tray or basket may be placed on the capping platform 64 either before or after containers have been placed in the tray or basket. Once the tray or basket is properly aligned beneath the sleeve 58, the capping mechanism 60 may be actuated to contact the caps or closures of the containers and to fully seal and cap the containers. This may be done by pressing the capping mechanism 60 against the tops of the containers to press the closures or caps tightly on the containers. This ensures that each container has been filled with the appropriate weight of a given compound, and that the containers are fully sealed before removal from the controlled environment within the system 10.

The foregoing descriptions of several embodiments made according to the disclosure of certain inventive principles herein are presented for purposes of illustration and description. The embodiments described are not intended to be exhaustive or to limit the invention to the precise form disclosed and, in fact, any combination of the components of the disclosed embodiments is contemplated. For example, the cover 54, scale 56, and well 57 may be associated with a separate isolator from the isolator capping mechanism 60. In addition, the sleeve 58 may be made of a non-flexible, telescoping material allowing for the relative movement of the capping mechanism, such as in the vertical direction. Modifications or variations are possible in light of the above teachings. The embodiments described were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention when interpreted in accordance with the breadth to which it is fairly, legally, and equitably entitled.

The invention claimed is:

1. An apparatus for processing a plurality of products by way of a capping mechanism, each of said products in need of a closure, comprising:
   a vessel including an inlet for receiving the plurality of products and an outlet for discharging the plurality of products under sterile and/or pyrogen free conditions; and
   a device adapted for applying a closure to each of the plurality of products in the vessel;
   wherein the device comprises a sleeve adapted for receiving the capping mechanism, said sleeve connected to a wall of the vessel;
   wherein the sleeve comprises a flexible sleeve having a rigid portion adapted for applying the closure to each of the plurality of products simultaneously; and
   wherein the sleeve is adapted to fully seal the capping mechanism from an interior of the vessel, and is further adapted to allow the capping mechanism to interact indirectly with the plurality of products within the vessel through the sleeve.

2. The apparatus of any of claim 1, further including a platform in the vessel, opposite the device, the platform for supporting the one or more products.

3. The apparatus of claim 1, further comprising the capping mechanism positioned in the sleeve.

4. The apparatus of claim 1, wherein the vessel comprises at least one flexible wall.

5. The apparatus of claim 1, wherein the vessel comprises a flexible bag.

6. The apparatus of claim 1, further including a scale associated with the vessel for weighing the plurality of products before or after applying the closure.

7. The apparatus of claim 6, further including a platform for supporting the product or products for being weighed on the scale.

8. The apparatus of claim 1, further including a conduit for pressurizing the vessel.

9. The apparatus of claim 1, further including a glove attached to the vessel for manipulating one or more of the product, the device, or the closure.

10. The apparatus of claim 1, further including a basket or tray for supporting the plurality of products in the vessel, and wherein the device is adapted to apply a closure to the plurality of products in a simultaneous fashion while positioned in the basket or tray.

* * * * *